April 22, 1952 R. A. HARTLEY 2,594,162
MAGAZINE TYPE SLIDE PROJECTOR
Filed May 17, 1947 6 Sheets-Sheet 1

INVENTOR.
Richard A. Hartley
BY
ATTORNEY

INVENTOR.
Richard A. Hartley
BY
ATTORNEY

April 22, 1952 R. A. HARTLEY 2,594,162
MAGAZINE TYPE SLIDE PROJECTOR
Filed May 17, 1947 6 Sheets-Sheet 3
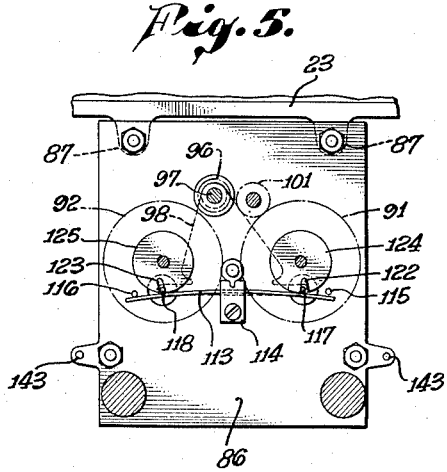
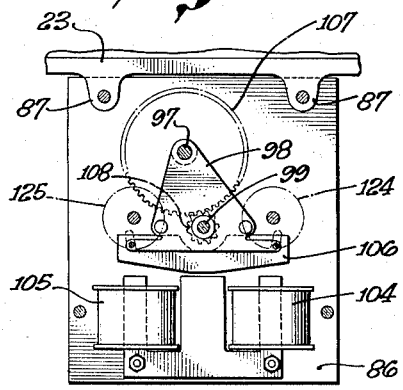
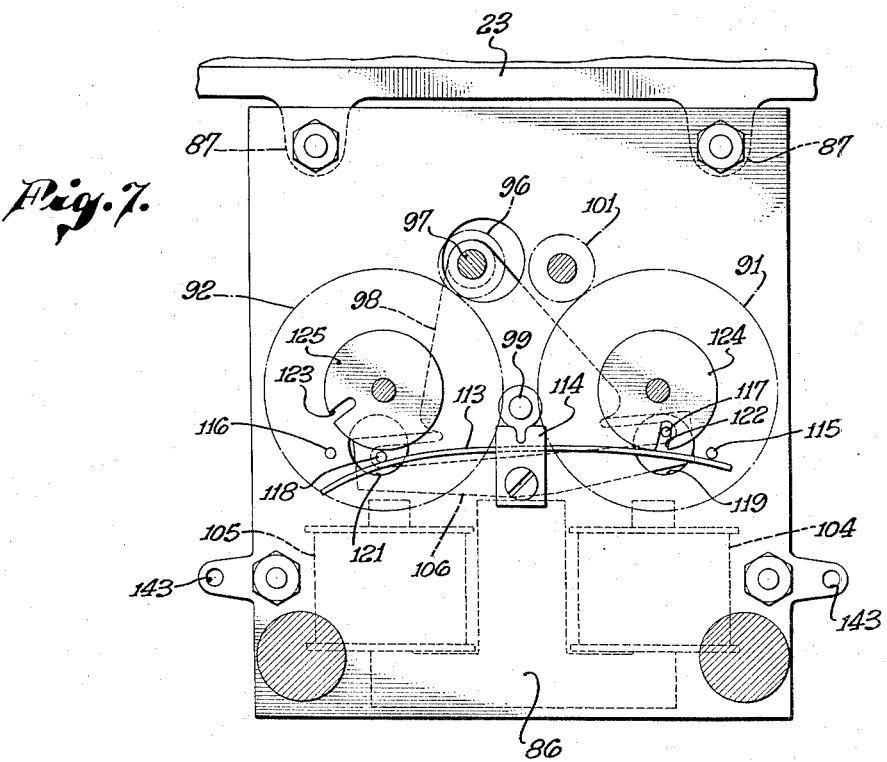
INVENTOR.
Richard A. Hartley
BY
ATTORNEY

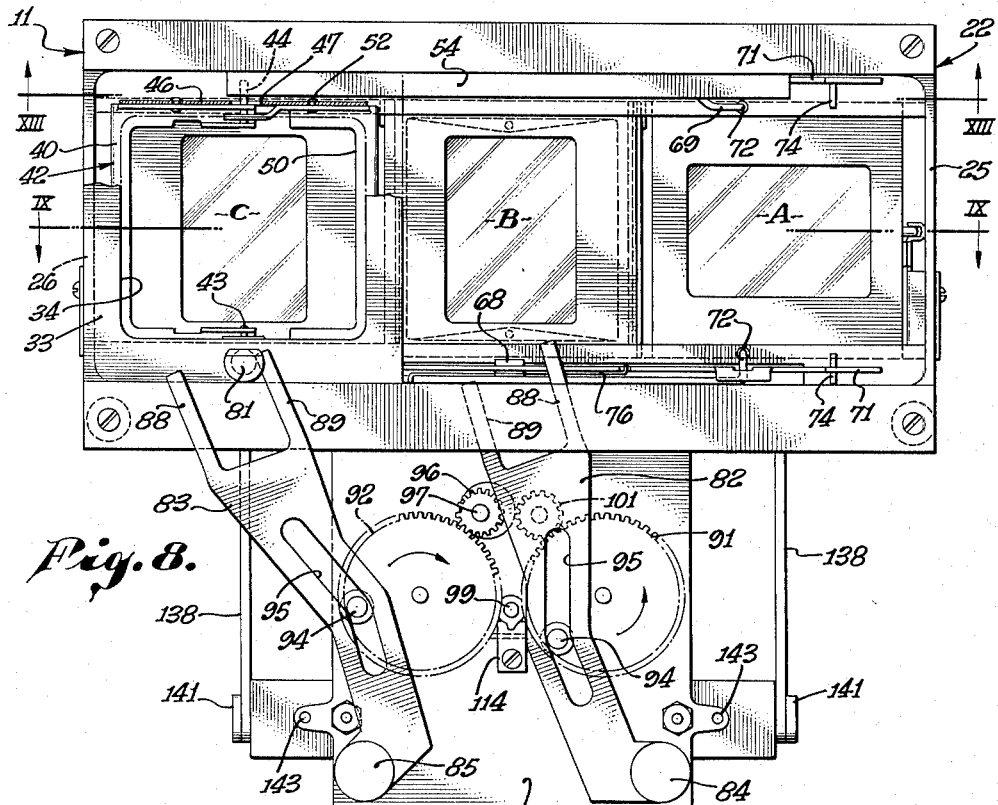
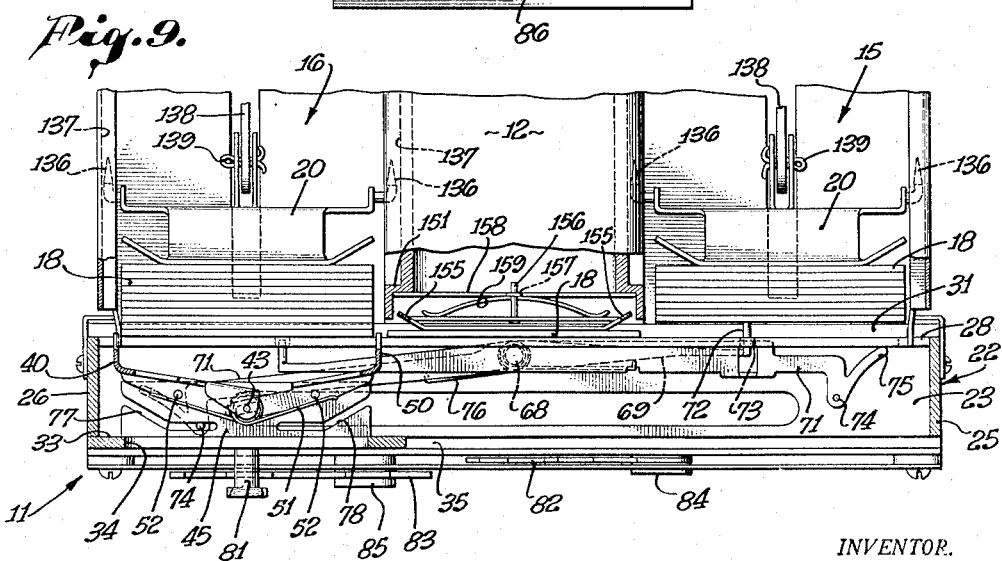

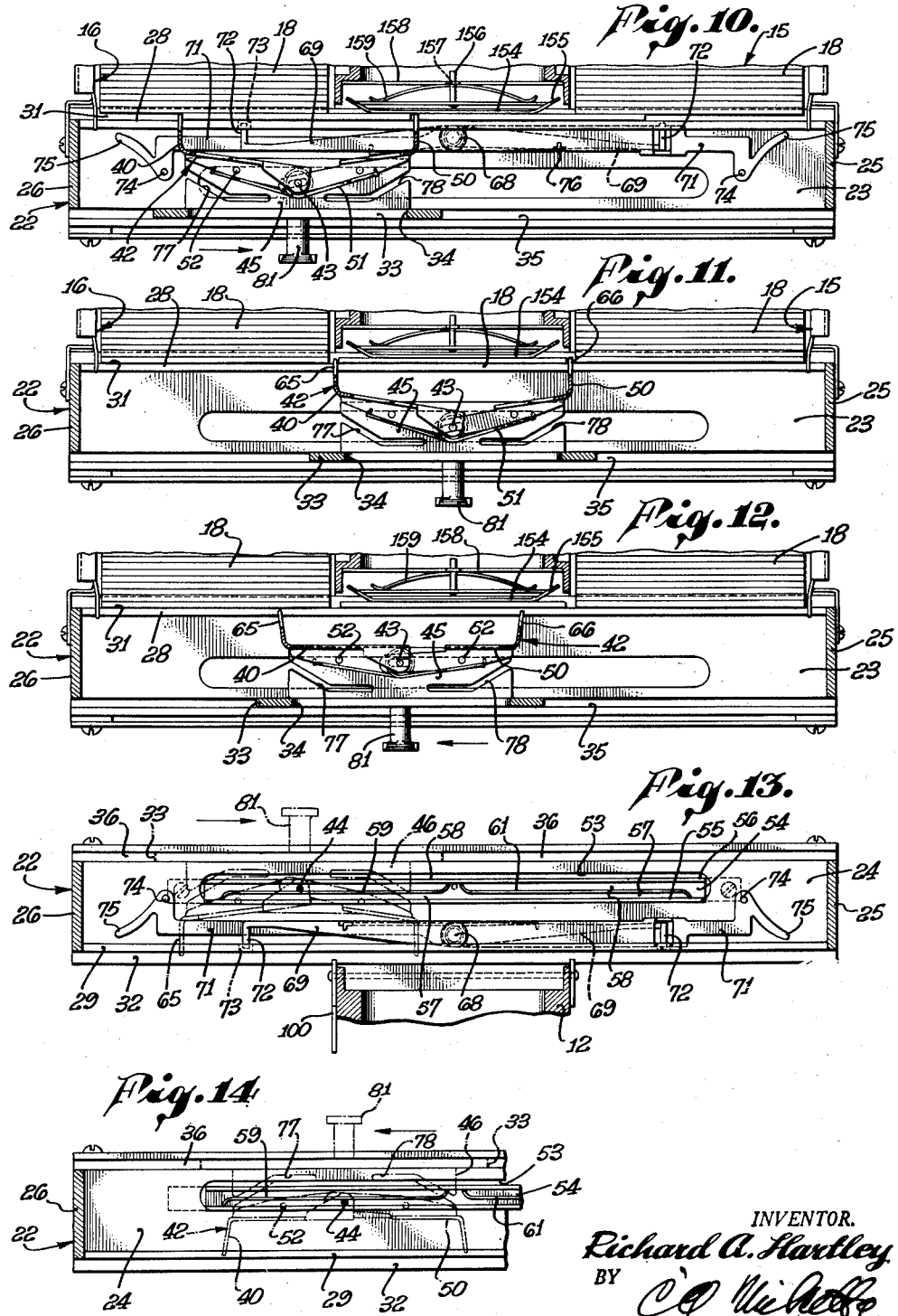

April 22, 1952 R. A. HARTLEY 2,594,162
MAGAZINE TYPE SLIDE PROJECTOR
Filed May 17, 1947 6 Sheets-Sheet 6

INVENTOR.
Richard A. Hartley
BY
ATTORNEY

Patented Apr. 22, 1952

2,594,162

UNITED STATES PATENT OFFICE 2,594,162

MAGAZINE TYPE SLIDE PROJECTOR

Richard A. Hartley, North Hollywood, Calif.

Application May 17, 1947, Serial No. 748,711

7 Claims. (Cl. 88—28)

This invention relates to a slide projector of the type equipped to transfer slides from one slide-holding magazine to another magazine by way of a slide-projecting position.

Slide projectors of the present type are in great demand for use during lectures, in institutions of learning, for home use and for other illustrative projects. Slide projectors have heretofore been proposed which provide a mechanism for shifting slides from a magazine into the projection position in line with the optical system of a projector and from the projecting position into a second magazine. All of these slide projectors known to me are deficient in many ways. For example, they are not equipped to shift a slide from the projecting position into either magazine, or to shift a slide from one magazine to the projecting position and return the slide to the same magazine. Often in lectures and the like it is desirable to refer back to a slide previously used, and the prior machines known to me are incapable of rendering this service. Also, slides are more or less delicately constructed and must be gently handled in order to extend the life of the slide. Slides are often damaged by using slides positioned in the same plane for pushing one another from one position to the other. This causes wear and tear on the edges of the slide and soon renders it inefficient, if not inoperable, in such slide projectors. Moreover, such slide projectors as are heretofore known to me are quite complicated and expensive and beyond the price range of a great many people desiring their use.

The present invention provides and discloses a slide projector that will not only feed slides from a magazine into the projecting position in line with the optical system and from this latter position into a second magazine, but the present device will shift the slide from the second magazine back into the optical position, and, if required, back into the first magazine. In order to protect the slides when being shifted from one position to the other, the present invention provides mechanical means for moving each individual slide and at no time is one slide dependent upon another slide to urge it from one position to the other. This function protects the edges of the slides and makes for a longer life. The present invention provides a slide transport which shifts the slides from one position to the other in such a gentle and accurate manner as to preclude any damage to the slide.

A primary object of the present invention is to provide in a slide projector a novel slide transport for shifting a slide from either of two slide-holding magazines into the projecting position of the projector and shifting the slide in the projecting position to either of the two magazines.

Another object is to provide an improved slide projector mechanism which will feed slides from a magazine into the projecting position in line with the optical system of the projector and from the latter position into a second magazine.

Another object is to provide a slide projector having a novel slide support for shifting a slide from the projecting position of a projector into a magazine and returning the slide to the said projecting position.

Another object is to provide in a slide projector a novel slide transport which may be readily adapted for operation manually or by power and which may be remote controlled from any distance.

Another object is to provide a slide projector which may be operated at regular or irregular intervals for transferring a slide from the projecting position of a projector to slide-holding magazines located on either side of the slide projecting position.

A further object is to provide a slide projector having the above characteristics wherein the mechanism is efficient, reliable, and will handle the slides gently so as not to damage them.

A still further object is to provide a slide projector having the above characteristics which shall be sufficiently simple in structure and inexpensive to manufacture as to enable its use in projectors and viewers at a comparatively small cost.

The above and other objects will be made apparent throughout the further description of the invention when taken in connection with the accompanying drawings wherein like reference characteristics refer to like parts. It is to be distinctly understood that the drawings are not a definition of the invention but merely illustrate one form by means of which the invention may be effectuated.

In the drawings:

Fig. 5 is a sectional view taken along the line V—V of Fig. 4.

Fig. 6 is a sectional view taken along the line VI—VI of Fig. 4.

Fig. 7 is an enlarged view of Fig. 5 showing certain of the parts of the mechanism in a different position.

Fig. 8 is an enlarged view of Fig. 3 showing certain parts of the mechanism in a different position.

Fig. 9 is a sectional view taken along the line IX—IX of Fig. 8.

Fig. 10 is a view similar to Fig. 9 showing parts of the mechanism in a different position.

Fig. 11 is a view similar to Figs. 9 and 10 showing certain of the parts in still another position.

Fig. 12 is a view similar to Figs. 9, 10 and 11 showing certain of the parts in still another position.

Fig. 13 is a sectional view taken along the line XIII—XIII of Fig. 8.

Fig. 14 is a partial view of Fig. 13 showing certain parts of the mechanism in a different position.

Figure 1:
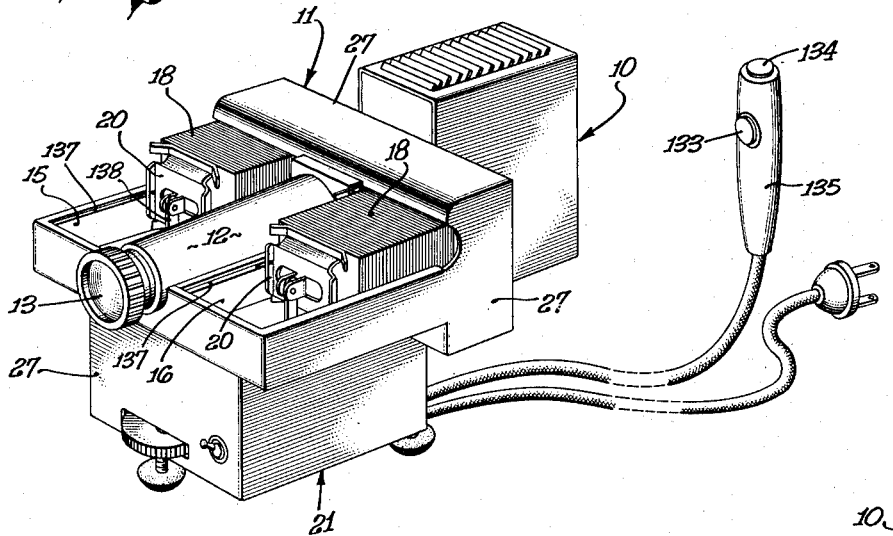
Fig. 1 is a three-quarters front perspective view of a slide projector embodying the invention.
Figure 2:
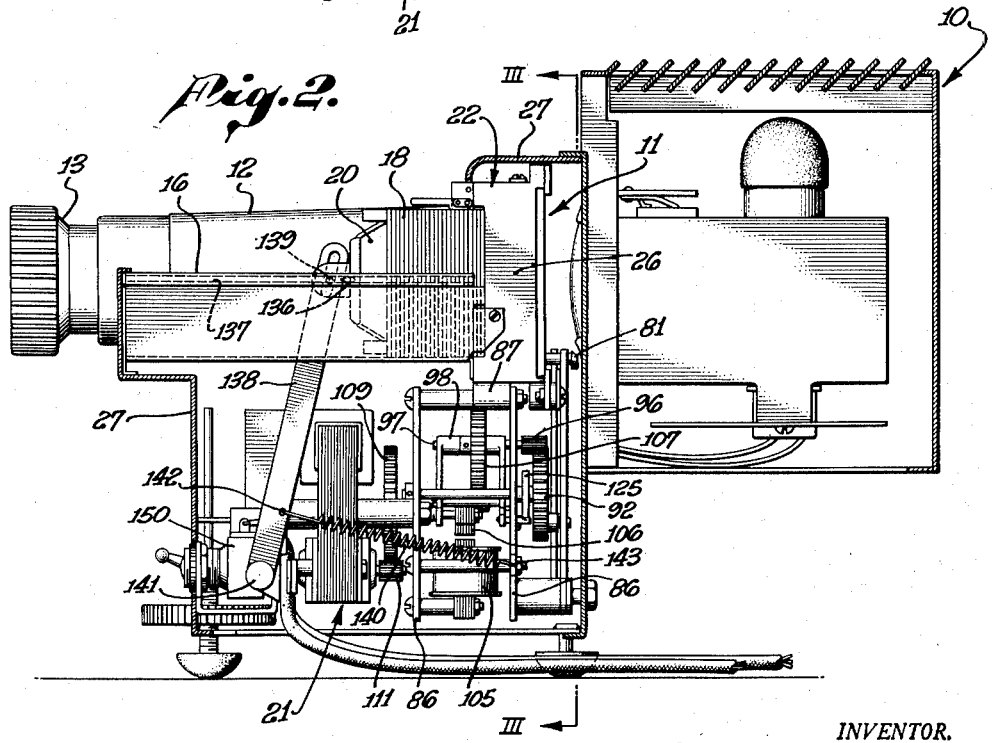
Fig. 2 is a side elevational view of Fig. 1 having the side cover removed.
Figure 3:
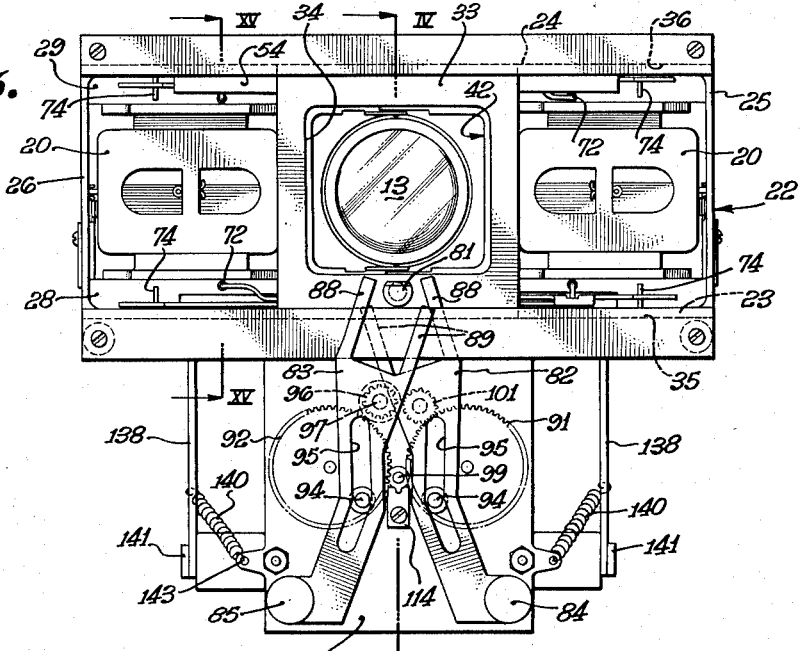
Fig. 3 is a sectional view taken along the line III—III of Fig. 2 having the cover removed.

Referring to the drawings, the numeral 10 indicates in its entirety the usual lamp and condensing system constructed of conventional parts; 11 indicates in its entirety a transport mechanism for shifting slides to and from a pair of spaced magazines on the opposite sides of a lens mount 12; the lens mount 12 is provided with the usual lens 13. The magazines are indicated at 15 and 16 and as shown, each magazine contains a plurality of slides 18. Each of the magazines is provided with a follower 20, later to be described. Power means represented in its entirety by 21 is provided for actuating the transport means 11.

Transport means

The transport means includes a frame 22 around which the entire device is connected and supported. The frame 22 is substantially rectangular in shape and consists of a base or bottom 23, a top 24, and sides 25 and 26. For the sake of simplicity, the entire housing or casing 27 of the device will be left out of the description of the invention, as it plays no part in the invention except as a covering for the device.

The front edges of the base 23 and top 24 terminate in flanges or transport plates 28 and 29, respectively. The flanges are recessed at their edges to form ways 31 and 32 along which the slides are guided from one position to the other, the upper edge of the slide resting in the recess or way 32, while the lower edge of the slide rests in the recess or way 31. The slides may assume three positions: A, aligned with magazine 15; B, aligned with the projecting position of the projector; and C, aligned with magazine 16.

For the purpose of shifting the slides to and from the positions A and C to the position B there is provided a shuttle plate 33. The shuttle plate is substantially square and is provided with an opening 34 therein of sufficient size to permit projecting the entire slide area. Guideways 35 and 36 are provided in the rear edges of bottom 23 and top 24 of the frame 22, respectively, along which the shuttle plate is shifted from one position to the other. The guideway 35 is formed by recessing the rear edge of the bottom 23, as shown at 37, and by recessing the rear bottom edge of top 24, as shown at 38. The rear edges of bottom 23 and top 24 have fixed thereto horizontal members 39 and 41, respectively, for forming channels with the recesses 37 and 38, respectively, the lower and upper edges of the shuttle plate 33 slidably engaging recesses or channels 37 and 38, respectively, and movable therealong to the positions A, B and C.

Figure 4:
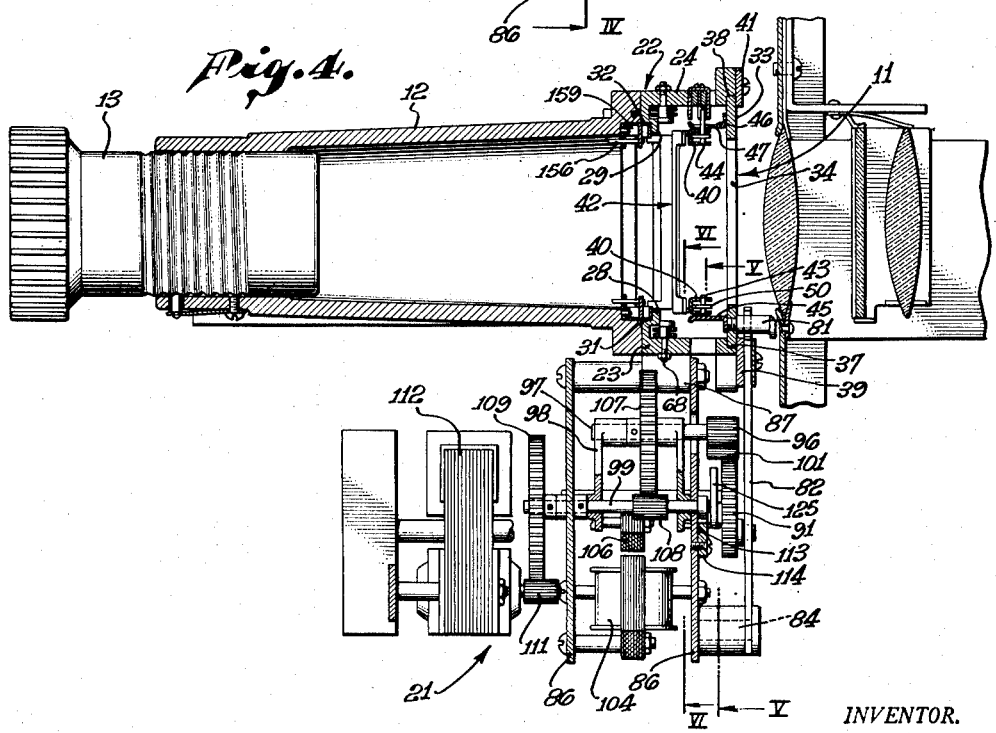
Fig. 4 is a sectional view taken along the line IV—IV of Fig. 3.

The shuttle plate 33 is provided with finger members 40 and 50, represented in an assembled condition as a frame structure 42, for releasably engaging the slides for shifting them from one position to the other. The lower and upper parts of each of finger members 40 and 50 are pivoted together by pins 43 and 44, respectively, to form a substantially square frame structure presenting an opening of substantially the same dimension and in alignment with the opening 34 in the shuttle plate 33. The pin 44 extends through slot 47 in plate 46, the plates 45 and 46 projecting from and being carried by the lower and upper ends, respectively, of shuttle plate 33 (see Fig. 4).

The transport means 11 includes finger extending and retracting means, slide-displacing means and power means 21 for moving the shuttle to and from the positions A, B and C.

Claw-opening and closing means

It is important to understand at the outset that the normal position of the shuttle 33 carrying the finger members 40 and 50 is in the projecting position B and that the shuttle will return to the position B at the completion of any operation. It is also important to understand that the fingers are in retracted position during their movement away from the position B to either the positions A or C, and in extended position during their movement from either position A or C to the central position B.

The fingers are biased toward their extended position by a spring 51, the center of which is coiled about the pivot point 43 and having one of its free ends engaging the back of the finger member 40 and at the other free end engaging the back of finger member 50. A similar spring may be provided at the top of the finger member and coiled about pivot point 44. The retraction and extension movements of the fingers are controlled by the fore and aft movements of the pins 43 and 44. Each of the finger members 40 and 50 is pivotally supported at its bottom and top by pivot pins 52 carried by plates 45 and 46, respectively. It can now be understood that by moving pivot points 43 and 44 forward in the slot 47, the finger members will turn about their respective pivot points 52 to retracted position, and upon moving the pivot points 43 and 44 rearwardly, the finger members will turn about their respective pivot points 52 to extended position.

Figure 15:
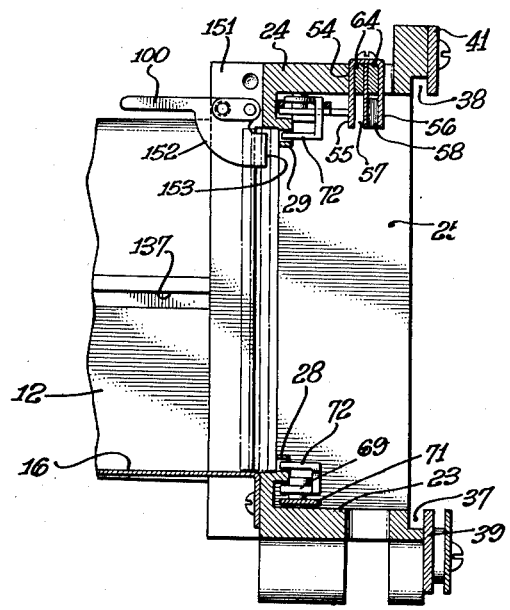
Fig. 15 is a sectional view taken along the line XV—XV of Fig. 3.

It is desired that the extension and retraction of the finger members 40 and 50 be automatic and in response to the movement of the shuttle 33. For this purpose there is provided an elongated transverse slot 53 in the top 24 of the frame. Within the slot 53 is positioned an inverted U-shaped member 54 having downwardly extending sides 55 and 56 (Fig. 15). The channel is divided into two parallel tracks or guideways 57 and 58. The trackways are separated by two aligned Z-shaped springs 59 and 61. The springs 59 and 61 are oppositely disposed and their inner adjacent ends are spaced apart to provide passage for the pivot pin 44 therebetween, as best shown in Figs. 13 and 14. The springs 59 and 61 are supported at their centers by attaching the upper portion of the center of the springs 59 and 61 to adjacent positions of the inverted U-shaped member 54. Any suitable means may be employed for fixing the center of the springs 59 and 61 to the member 54, such as is shown at 64 in Fig. 15, the means 64 being positioned in the upper portion of the member 54 so as not to block the passageways 57 and 58.

It will be noted that the inner adjacent ends of the Z-shaped spring members 59 and 61 (Figs. 13 and 14) are curved rearwardly, and in either direction that the pivot pin 44 may move from its normal position at top center of the projecting position B, the rearwardly curved portion of the cooperating spring 59 or 61 will guide the pin 44 into the forward track 57 and hold the fingers in retracted condition during movement of the shuttle away from position B. The outer free ends of the springs 59 and 61 are curved forwardly so that as the pin 44 passes the outer free end of either spring 59 or 61, the forward curved end of the cooperating spring will guide the pin into the rear track 58 and hold the fingers in extended condition during the return of the shuttle from either of the positions A or C to position B.

Each of the finger members 40 and 50 is formed to provide upper and lower slide-engaging tabs or fingers 65 and 66, respectively. The tabs or fingers 65 and 66 project forwardly and engage the side edges of the adjacent slide. The finger members 40 and 50 are designed to positively move separate slides and at no time is a slide dependent upon an adjacent slide to move it from one position to the other. As can be seen in Fig. 10, the fingers 66 are employed to move the slide from position B to position A, while the fingers 65 are employed to move the slide from position C to position B.

*Slide-displacing means*

In order that a slide may be moved from the projection position B into either of the magazines 15 or 16, it is necessary to displace the stack of slides 18 in the magazine into which the slide is to enter sufficiently for the entering slide to pass the edge of the innermost slide in the stack 18. It is also desired that the displacing means be automatic and in response to the movement of the shuttle 33 carrying the finger members. In order that the stack of slides 18 may be positively tilted or displaced for the reception of a slide in either magazine, two sets of cam-actuated levers are provided. One set is carried by the bottom 23 of the frame and the other set is carried by the top 24 of the frame. Each of the sets is identical and operates simultaneously for engaging the innermost slide in a stack adjacent its lower and upper ends. Since each of these sets is identical and their operation simultaneous, only one set carried by the bottom or base 23 of the frame 22 will be described.

Each set consists of a pair of similar cam-operated levers disposed in opposite relation to each other and pivoted on a common pivot 68 disposed in the plane of the longitudinal center of the projecting position B. The lower set is mounted on the base or bottom 23 of the frame. The levers are pivoted intermediate their length to provide a short leg 69 and a longer leg 71. Each of the short legs 69 terminates in a forwardly extending projection 72 adapted to extend through an opening 73 provided in the transport plate or flange 28 upon the turning of the short leg 69 of a lever forward toward its cooperating stack of slides 18. Each of the long legs 71 of the levers is provided adjacent its free end with a vertical pin 74 and a stop member 75 adapted to contact the flange 28. The ends of the levers carrying the stop member 75 are biased forward into contact with flange 28. This may be effected by a spring 76 having its center coiled about the pivot 68 and its free ends engaging the rear edges of the legs 71, thereby normally holding the projections 72 out of contact with the slides in its cooperating magazine.

For the purpose of actuating levers to cause the proper projection 72 to displace its corresponding slides in response to movement of the shuttle 33, there are provided in the lower and upper finger member supporting plates 45 and 46, respectively, which are carried by the shuttle 33, oppositely disposed cam slots 77 and 78, arranged to cooperate with pins on dogs 74 carried by the ends of the long legs 71 of the levers. Upon referring to Fig. 9, it will be noted that the shuttle 33 is in the position C and that it is desired to move the slide in the position B into the position A while simultaneously moving the slide in the position C into the projecting position B. In order to move this slide in position B into the position A, it is necessary to displace the slides 18 in the magazine 15 sufficiently for the incoming edge of the slide from the projecting position B to pass the innermost slide in the magazine 15. With the shuttle 33 in the position C, the cam slot 77 having engaged the dog 74 during its movement to the left, turns the cooperating lever about the pivot 68 and extends the pins 72 in the other end of the lever forwardly through an opening 73 in the flange 28 and pushes the slides in magazine 15 forwardly. As the shuttle 33 moves to the right, as viewed in Figs. 9 and 10, the tabs or fingers 66 of the finger member 50 will engage the edge of the slide in the position B, while the tabs or fingers 65 will engage the corresponding side of the slide in the position C. As the shuttle moves to the right, the slide in the position B will enter position A. However, prior to the slide reaching the pin 72, the cam slot 77 will have released the pin 74 and the dog 72 returns to its normal position by the spring 76, thereby moving the pin 72 out of the path of the incoming slide. Conversely, when the shuttle 33 is in the position A, the cam slot 78 will engage the corresponding dog 74 at position A and turn the lever to cause the projection 72 to displace the slides in the position C or magazine 16. Accordingly, the slides are automatically displaced in either magazine 15 or 16 for receiving a slide from the projecting position B in response to the movement of the shuttle 33.

*Power means for operating the shuttle*

The power means for operating the shuttle 33 is best illustrated in Figs. 2 to 8 inclusive. The shuttle is provided centrally and adjacent its lower edge with a projection 81. A pair of shift levers 82 and 83 is provided for shifting the shuttle 33 from the position B to and from the positions A and C, respectively. The levers 82 and 83 are pivoted at their bottom on stub shafts as shown at 84 and 85, respectively, the shafts being carried by the lower end of a mounting plate 86. The upper end of mounting plate 86 is supported by integral projections 87 extending downwardly from the bottom 23 of the frame. The upper ends of the shift levers 82 and 83 terminate in spaced legs 88 and 89 for engaging projection 81 on the shuttle 33. The levers are disposed in opposite relation one to the other, the lever 82 being adapted to shift the shuttle 33 to and from the position B to position A, while the lever 83 is utilized to shift the shuttle 33 to and from the position B to position C. The legs 89 of the levers 82 and 83 are shorter than the legs 88 for permitting the projection 81 on the shuttle plate to pass over the top thereof, as clearly shown by the drawings. Means are provided for selectively operating the levers 82 and 83, which consist of crank gears 91 and 92 mounted on the rear end of shafts 80 and 90 carried by spaced transverse mounting plates 86. Each of these crank gears is provided with a crank pin 94 that engages a cam slot 95 in its associated lever so that when the crank gear 91 is rotated in counterclockwise direction, as viewed in Figs. 3 and 8, the lever 82 will move the shuttle 33 to the position A and return it to the position B during a single revolution of the crank gear 91 and, conversely, the lever 83 will move the shuttle 33 from the position B to position C and return to position B during a single revolution of the crank gear 92, the latter operating in a clockwise direction. For the purpose of selectably rotating the crank gears 91 and 92, there is provided a pinion 96 carried by the rear end of a shaft 97. The shaft 97 is mounted in a saddle 98 oscillatably carried by a shaft 99, the operation of which will be later described. Normally, the pinion 96 is out of driving engagement with either of the crank gears 91 or 92. When the saddle 98 is oscillated to the right, as viewed in Figs. 5 to 7 inclusive, the pinion 96 will be brought into mesh relation with idle gear 101, the latter meshing with the gear 91. The pinion 96 is adapted for continuous rotation and means is provided for disengaging the pinion 96 from the gear 101 at the end of each complete revolution of the gear 91. Conversely, when the saddle 98 is oscillated to the left, the pinion 96 will mesh with the gear 92 and rotate the latter in a clockwise direction, similar means being provided for disengaging the pinion 96 from the gear 92 at the end of each complete revolution of the gear 92.

The means for oscillating the saddle 98 consists of a pair of magnetic coils 104 and 105 arranged to cooperate with opposite ends of an armature 106, the latter being carried by and rigidly fixed to the bottom of the saddle 98, whereby upon energizing the coil 104, the armature 106 will cause the saddle 98 carrying the pinion 96 to oscillate to the right for meshing with the idle gear 101. Upon energizing the coil 105, the armature will cause the saddle 98 to rotate to the left and mesh the pinion 96 with the gear 92.

The pinion 96 is continuously operated by way of the shaft 97, gear 107, pinion 108, shaft 99, gear 109 and drive pinion 111, the latter being drivably connected to a suitable motor 112. As above stated, the pinion 96 is adapted for continuous operation and is normally out of driving engagement with the crank gears 91 and 92. Means is provided for biasing the pinion toward its neutral position, which means consists of a spring 113 supported at its center by bracket 114 carried by the rear mounting plate 86. Adjacent the ends of the spring 113 and positioned thereabove are rearwardly extending projections 115 and 116 carried by the mounting plate 86 for preventing upward movement of the ends of the spring 113. The opposite lower ends of the saddle 98 are provided with rearwardly extending projections 117 and 118. These projections 117 and 118 extend through slots 119 and 121 in the mounting plate 86 and overlie the spring 113, the latter exerting equal tension on the projections and maintaining the saddle in neutral position.

For the purpose of limiting the crank gears 91 and 92 to a single revolution during each energization of the coils 104 and 105, respectively, the pins 117 and 118 extend into slots 122 and 123 provided in cam plates 124 and 125, respectively. These cam plates 124 and 125 are positioned rearwardly of gears 91 and 92 and are rigidly fixed and rotatable therewith. Therefore, as long as the pins 117 and 118 are in engagement with the slots 122 and 123, respectively, the gears 91 and 92 are held against rotation. However, upon energizing the coil 104, the armature carried by the saddle 98 will oscillate to the right and the pin 117 will depress spring 113 and urge the same downwardly, the pin 117 passing out of the slot 122 in the cam plate 124, and as the cam plate 124 rotates simultaneously with the gear 91, the outer peripheral surface of the circular cam plate 124 will hold the pin 117 downwardly. Since the pin is carried by the saddle 98, the saddle will be held in its clockwise position and pinion 96 in driving relation with the gear 91 until the plate 124 makes a complete revolution and the slot 122 comes into alignment with the pin 117, permitting the spring 114 to move the pin upwardly and carrying the saddle 98 to its normal position and pinion 96 out of engagement with gear 91. Conversely, upon energizing the coil 105, the armature will be drawn downwardly and the saddle 98 turned to the left as viewed in Fig. 7, bringing the pin 118 downwardly out of the slot 123 in cam plate 125, the outer surface of the cam plate 125 operating to hold the pin 118 downwardly and the saddle 98 to the left with the pinion 96 in engagement with the gear 92 until a complete revolution is effected and the pin 118 is returned into the slot 123, permitting the spring 113 to return saddle 98 to its normal position and the pinion 96 out of engagement with the gear 92.

Fig. 13 is a diagrammatic illustration of the wiring diagram wherein the motor 112 is adapted for continuous operation by current supplied by way of conductors 127 and 128, the circuit being controlled by switch 129. The coils 104 and 105 are supplied with current by way of the conductors 130, 131 and 132, the conductor 131 being neutral and the two circuits selectively controlled by switches 133 and 134. The switches 133 and 134 are shown in Fig. 1 and may be suitably installed in a convenient handle 135.

Suitable means is provided for carrying the slides 18 in the magazines 15 and 16 toward the transport means. The means consists of a follower 20 in each of the magazines 15 and 16. The opposite sides of the follower may be provided with guides 136 extending into grooves 137 for maintaining the followers 20 in aligned position with the slides 18. The proper tension is supplied to the followers 20 by means of follower arms 138 pivotally connected at their upper end to the followers 20 as shown at 139, the lower end of each follower arm 138 being turnably carried by a stub shaft 141, the latter projecting from the switch housing 150. A spring 140 having one of its ends connected adjacent the lower end of the follower 138, as shown at 142, and its other end connected to a projection 143 carried by the mounting plate 86, operates to urge its cooperating follower into contact with the stack of slides, the latter moving toward the transport plate as each slide is removed from a magazine. When it is desired to insert additional slides in either of the magazines 15 and 16, it is only necessary to manually move the follower forward and release the same after the slides have been inserted in the magazine.

Figure 16:
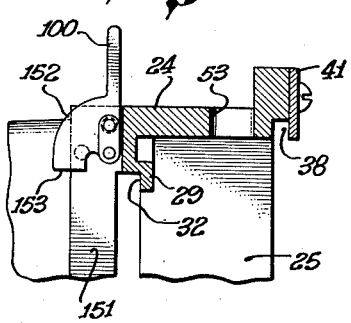
Fig. 16 is a partial view of Fig. 15 illustrating another position of a detail embodying the invention.
Figure 17:
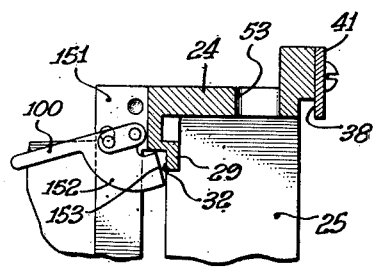
Fig. 17 is a view similar to Fig. 16 showing the detail in still another position.
Figure 18:
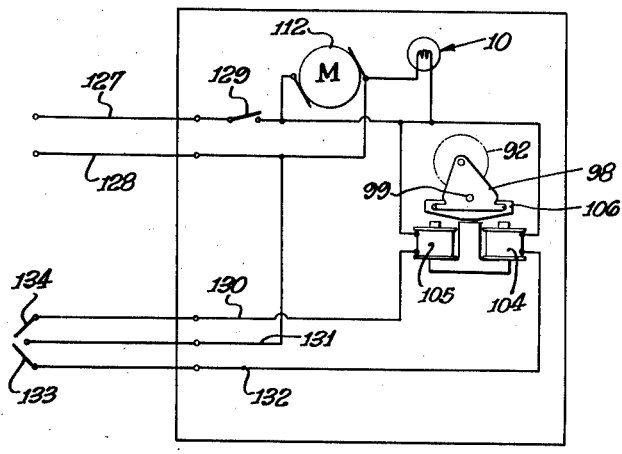
Fig. 18 is a wiring diagram, more or less diagrammatic, illustrating the electrical system embodied in the invention.

For the purpose of providing for slides having different thicknesses, the cooperating lower and upper slide ways 31 and 32, respectively, are of sufficient width to accommodate the thickest standard slide, and means is provided for adjusting the space in the slide way 32 at the entrance to either side of the position B to correspond with the thickness of the slides being used. Also, the adjusting means is adapted to close the slide way entrance 32 to prevent the entrance of a slide from either position A or C to the position B. The adjusting means consists of a pivoted lever 100 carried by each side of a flange 151 projecting radially from the rear end of lens mount 12. The levers 100 are pivoted to flange 151 adjacent the entrances to the projecting position B and at the top thereof. The levers 100 are each provided with a curved flange 152, presenting a straight face 153. Referring to Figs. 15, 16 and 17, Fig. 15 shows the lever 100 in horizontal position and positioning the face 153 to permit a relative narrow slide to enter position B. Fig. 16 shows the lever 100 in a vertical position to permit a slide of maximum thickness to enter the position B. Fig. 17 shows the lever 100 positioned downwardly from its position in Fig. 15 and closing the passageway to prevent the entrance of a slide to the position B. The latter position is employed when changing slides in the magazines or in moving the device from one place to the other.

For the purpose of maintaining the slide in proper aligned position in the position B, there is provided a spring-held frame member 154 (see Figs. 9 to 12, inclusive). The sides of frame 154 terminate in forwardly extending flanges 155 for guiding the slide to the rear of the frame 154 and along the slide passageway.

The upper and lower members of the frame member 154 are each provided at their centers with a forwardly extending pin 156. These pins extend through openings 157 provided in cross members 158 carried by the flange 151. Springs 159 are interposed between the cross members 158 and the corresponding lower and upper members of the frame 154. The spring 159 operates to urge the frame 154 rearwardly and against the slide or, in the absence of a slide, being in the position B, the frame will rest against the lower and upper slide transport plates 28 and 29. The frame 154 presents an opening comparable to the opening 34 in the shuttle plate 33.

The operation of the device is as follows: Upon energizing the coil 104, saddle 98 is turned to the left by the armature 106, meshing the pinion 96 with the gear 101, the latter being in mesh relation with the crank gear 91. The crank gear 91 is rotated a single revolution and the shuttle 33 is carried from the position B to the position A and returned to the position B by means of the shift lever 82. This procedure may be repeated or the coil 105 may be energized by closing the switch 134, which will cause the saddle 93 to be turned to the left by means of the armature 106, bringing the pinion 96 into mesh relation with the crank gear 92 and turning the same a complete revolution during which time the shift arm 83 carries the shuttle 33 from the position B to the position C and returned to position B.

During the movement of the shuttle 33 from the position B to the position A, the cam slot 78 will engage the pin 74 in the leg 71 of the cooperating lever, and the lever will be turned to urge the pin 72 carried by its short end 69 forward through the opening 73 in the plate 28 and push the slides 18 in the magazine 16 forward so that upon the return of the shuttle 33 from the position A to the position B, the tabs or fingers 65 of the finger member 40 will urge the slide in the position B into the position C. It will be noted that as the shuttle plate moves toward the position B, the slot 78 will release the pin 74, and the spring 76 will operate to turn the lever and withdraw the pin 72 from the recess 73 in the plate 28 prior to the slide reaching the position of the pin 72, whereby the slide is permitted to pass along the slide way and into its position in the magazine 16. Also, during the movement of the shuttle 33 from the position B to position A, the pin 44 carried by the finger members is directed by the spring 61 into the forward track 57 in the inverted U-shaped member 54, thereby holding the fingers in retracted condition during the movement of the shuttle 33 from the position B to position A. When the pin 44 reaches the outer end of the spring 61 and passes the forwardly turned end thereof, the pin 44 will be directed into the rear passageway 58 in the member 54 and thereby extend the fingers during the movement of the shuttle from the position A to position B. It will also be noted that during the movement of the shuttle from the position A to position B, the fingers 65 of the finger member 40 will operate to urge the slide in the position B to the position C while the fingers 66 on the finger member 50 will engage the slide in the position A and move it to position B. The slides are at all times positively moved by the finger members and at no time is a slide dependent upon another slide for moving it from one position to the other. The operation of the device for moving the slides from the position C to the position B is identical except for the direction as that described in the connection with the movement of the slide from the position A to the position B.

While there has been illustrated and described one form of the present slide changing device, it will be obvious to those skilled in the art that certain changes, modifications, substitutions, additions and omissions may be made in the structure herein disclosed without departing from the spirit and scope of the appended claims.

I claim:

1. A slide-exhibiting apparatus comprising, in combination: a pair of spaced magazines each adapted to carry slides in stacked condition; a track member disposed transversely to said magazines and interconnecting one end of each for guidance of slides therebetween to and from an intermediate slide-exhibiting position; means urging the stacked slides against said track member, whereby the slides confronting said magazines tend to obstruct transport of slides thereto; a shuttle for transporting slides along said track member, said shuttle having a pair of finger members which are spaced apart by substantially a slide width, said finger members adapted to engage and to disengage slide members upon extension and retraction, respectively, of said finger members; means automatically operating by movement of said shuttle to extend said finger members when they arrive at and confront either of said magazines, and to retract them when they arrive at and confront said slide-exhibiting position; and means for selectively displacing a magazine-confronting slide into its corresponding magazine in response to a shuttle movement intended to transport an exhibited slide to a position confronting the said corresponding magazine.

2. A slide-exhibiting apparatus as in claim 1 and including in combination therewith means for moving the shuttle through a slide-changing cycle which both begins and ends with the pair of finger members confronting said slide-exhibiting position.

3. A slide-exhibiting apparatus as in claim 1 and including in combination therewith shuttle-reciprocating means adapted to be controlled to selectively transport a slide confronting either magazine to said slide-exhibiting position.

4. A slide-exhibiting apparatus as in claim 1 and including in combination therewith controllable motor means for moving the shuttle through a slide-changing cycle in which the shuttle is moved from a position in which said pair of finger members confronts said slide-exhibiting position, selectively to a position in which said finger members confront either said magazine to said slide-exhibiting position, thence again to said slide-exhibiting position.

5. A slide-exhibiting apparatus comprising, in combination: a pair of spaced magazines, each adapted to carry slides in stacked condition; a track member interconnecting one end of each said magazine for guidance of slides therebetween to and from an intermediate slide-exhibiting position; a shuttle adapted to transport slides along said track member, said shuttle having a pair of slide-engaging finger members spaced apart by substantially a slide width; and means for causing said shuttle to selectively execute a slide changing cycle wherein said pair of fingers is moved, from an initial position confronting said slide-exhibiting position, selectively to a position confronting either said magazine and again to said slide-exhibiting position.

6. In combination with a slide-exhibiting apparatus including a pair of spaced magazines, each adapted to carry slides, and having a slide-exhibiting position defined therebetween, and a slide-transporting shuttle reciprocatable from said slide-exhibiting position to and from each said magazine; shuttle reciprocating means connected to a single drive source and comprising a pair of levers each selectively engageable with said shuttle, and means for selectively moving each said lever through a single, repeatable, complete cycle which includes transport of a slide from a selected magazine to said slide-exhibiting position.

7. A slide-exhibiting apparatus comprising, in combination: a pair of spaced magazines each adapted to carry slides; a track member interconnecting one end of each said magazine for guidance of slides therebetween to and from an intermediate slide-exhibiting position; a shuttle adapted to transport slides along said track member, said shuttle having a pair of finger members which are spaced apart by substantially a slide-width, said finger members adapted to engage and disengage slide members upon extension and retraction, respectively, of said finger members; and means automatically operating by movement of said shuttle to extend said finger members when they arrive at and confront either of said magazines, and to retract them when they arrive at and confront said slide-exhibiting position.

RICHARD A. HARTLEY.

REFERENCES CITED

The following references are of record in the file of this patent:

UNITED STATES PATENTS

| Number | Name | Date |
|---|---|---|
| 1,073,331 | Colardeau | Sept. 16, 1913 |
| 1,349,640 | Trueblood | Aug. 17, 1920 |
| 1,437,112 | Lepine | Nov. 28, 1922 |
| 1,691,414 | Thornton | Nov. 13, 1928 |
| 1,729,304 | Wagner | Sept. 24, 1929 |
| 1,752,952 | Jelenik | Apr. 1, 1930 |
| 1,839,545 | Frye | Jan. 5, 1932 |
| 1,850,903 | Tryon et al. | Mar. 22, 1932 |
| 1,982,739 | Kaden et al. | Dec. 4, 1934 |
| 2,069,595 | Thomas | Feb. 2, 1937 |
| 2,255,719 | Warriner | Sept. 9, 1941 |
| 2,260,660 | Darwin | Oct. 28, 1941 |
| 2,310,047 | Waldeyer | Feb. 2, 1943 |